United States Patent
Nagraj Rao et al.

(10) Patent No.: US 12,067,087 B2
(45) Date of Patent: Aug. 20, 2024

(54) SENSOR DOMAIN ADAPTATION

(71) Applicant: Ford Global Technologies, LLC, Dearborn, MI (US)

(72) Inventors: Nikhil Nagraj Rao, Sunnyvale, CA (US); Akhil Perincherry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 17/330,692

(22) Filed: May 26, 2021

(65) Prior Publication Data

US 2022/0383040 A1    Dec. 1, 2022

(51) Int. Cl.
*G06F 18/28* (2023.01)
*G06N 3/04* (2023.01)
*G06N 3/08* (2023.01)

(52) U.S. Cl.
CPC ............. *G06F 18/28* (2023.01); *G06N 3/04* (2013.01); *G06N 3/08* (2013.01)

(58) Field of Classification Search
CPC ......... G06F 18/28; G06F 18/214; G06N 3/04; G06N 3/08; G06N 3/09; G06N 3/096; G06V 20/56; G06V 10/764; G01C 21/26; G01C 21/28; G01C 21/36
USPC ........................................................ 382/159
See application file for complete search history.

(56) References Cited

U.S. PATENT DOCUMENTS

| | | |
|---|---|---|
| 10,901,428 B2 | 1/2021 | Georges et al. |
| 2012/0185212 A1 | 7/2012 | Ekelin |
| 2018/0188733 A1 | 7/2018 | Iandola et al. |
| 2020/0027442 A1* | 1/2020 | Mathur .................. G06N 3/08 |

FOREIGN PATENT DOCUMENTS

WO    2020251523 A1    12/2020

\* cited by examiner

*Primary Examiner* — Stephen P Coleman
(74) *Attorney, Agent, or Firm* — Frank A. MacKenzie; Bejin Bieneman PLC

(57) ABSTRACT

A system includes a computer programmed to receive first sensor data from a first sensor, wherein the first sensor data is defined in part by a first data space that includes first parameters of the first sensor, and second sensor data from a second sensor, wherein the second sensor data is defined in part by a second data space that includes second parameters of the second sensor, to input the first sensor data and the second sensor data to a machine learning program to train the machine learning program to determine a domain translation of data from the first data space to the second data space, and then to input a set of training data received from the first sensor to the trained machine learning program to generate a training dataset based on the determined domain translation of data from the first data space to the second data space.

20 Claims, 6 Drawing Sheets

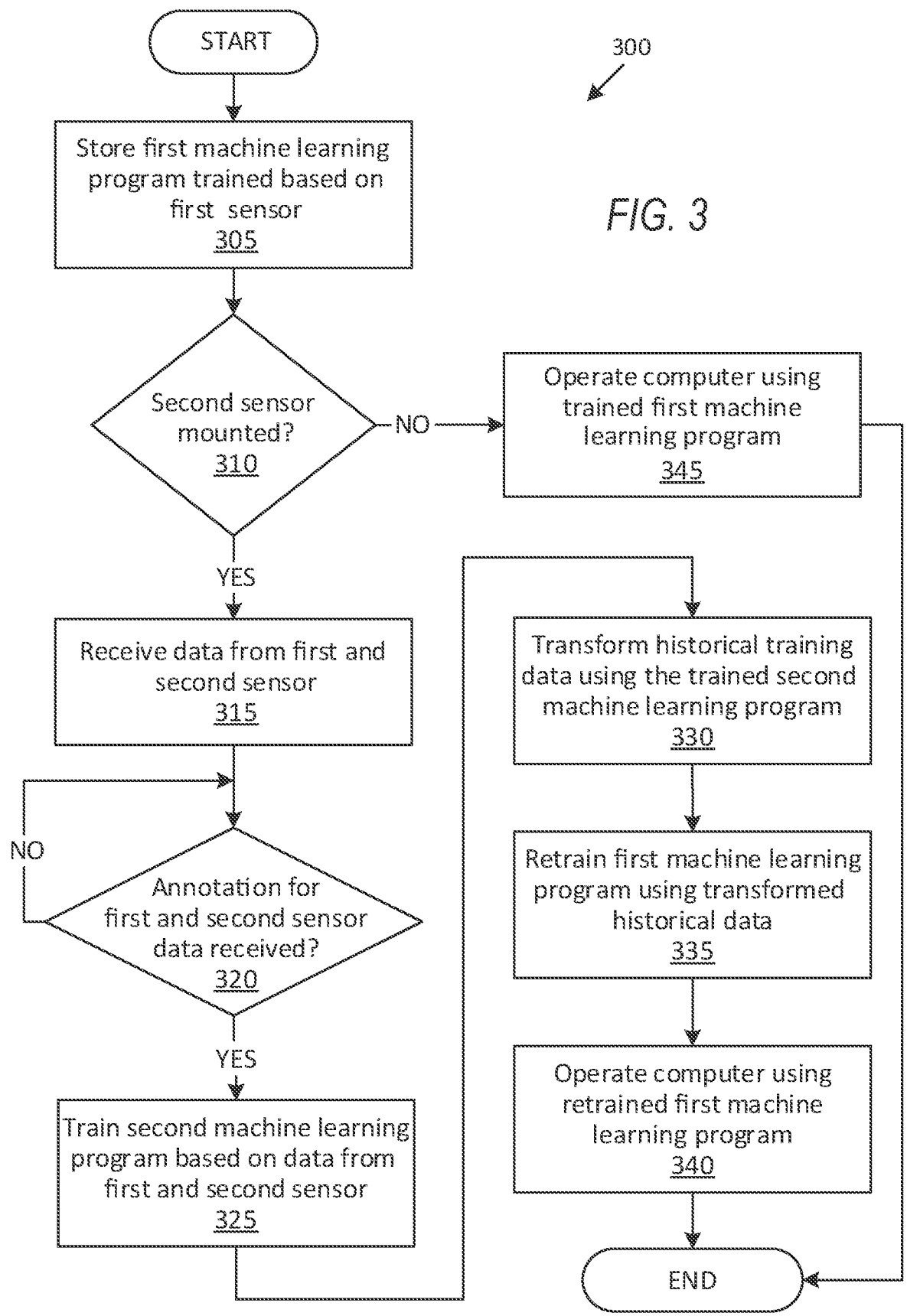

SENSOR DOMAIN ADAPTATION

BACKGROUND

A machine learning program, e.g., a neural network model, can be trained to detect objects, lanes, etc., in received image data. Typically, a large amount of annotated training data is needed for training of a machine learning program. For example, image data can be collected from a vehicle camera including various types of objects. Such image data is typically dependent on the sensor parameters, e.g., resolution, a field of view, Color Filter Arrays (CFA), gamma correction, exposure, etc., and configuration of the sensor, e.g., pose, location, etc. Sensors of varying parameters, e.g., resolution, focal lengths, etc., can be used in a vehicle.

BRIEF DESCRIPTION OF THE DRAWINGS

FIG. 3 is a flowchart of an exemplary process for training a machine learning program that was trained to operate using data received from the first sensor, then to operate using data received from a second sensor.

DETAILED DESCRIPTION

Introduction

Figure 1:
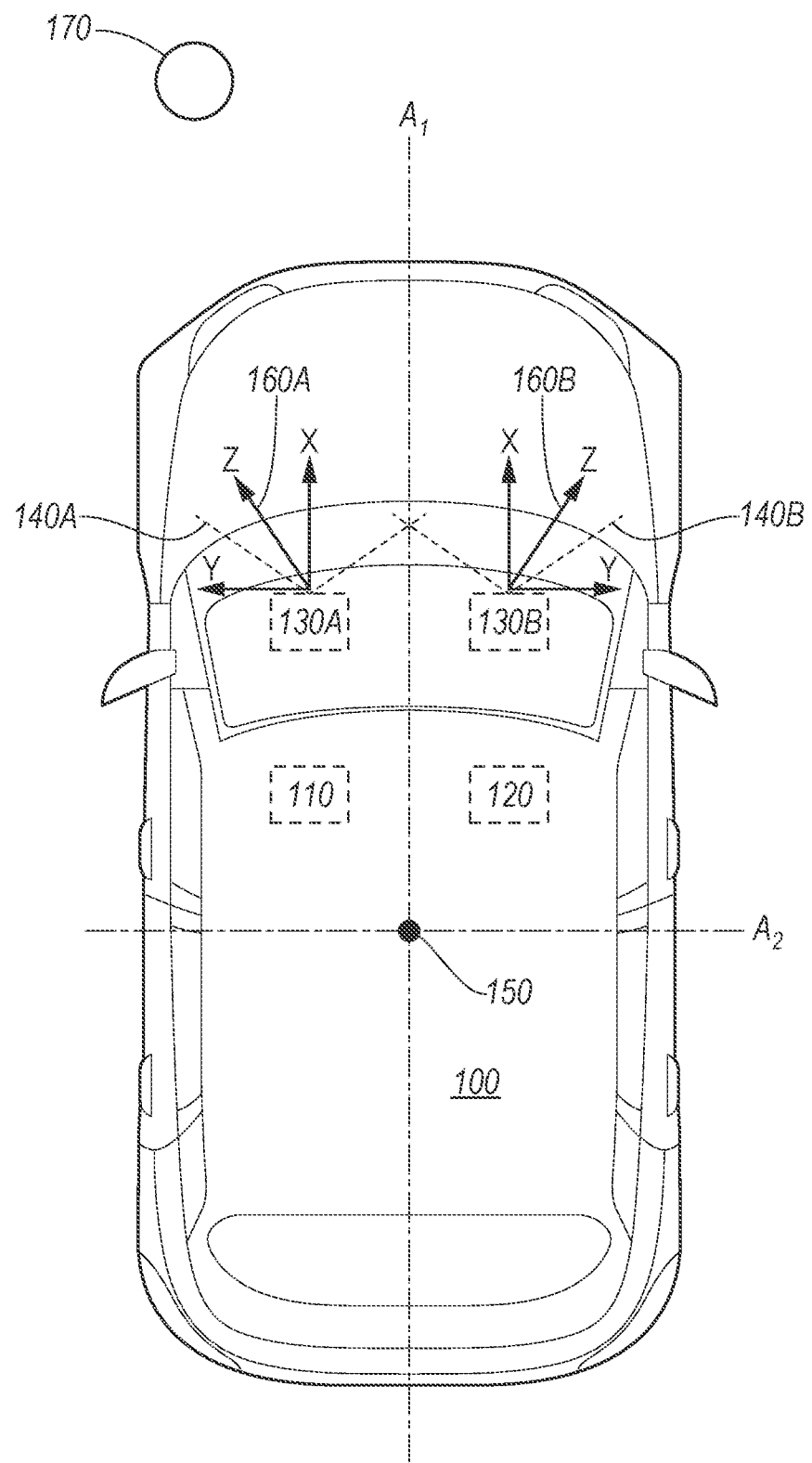
FIG. 1 shows an example vehicle with a first and a second sensor.

Disclosed herein is a system comprising a computer including a processor and a memory, the memory storing instructions executable by the processor to receive first sensor data from a first sensor, wherein the first sensor data is defined in part by a first data space that includes first parameters of the first sensor, and second sensor data from a second sensor, wherein the second sensor data is defined in part by a second data space that includes second parameters of the second sensor, to input the first sensor data and the second sensor data to a machine learning program to train the machine learning program to determine a domain translation of data from the first data space to the second data space; and then to input a set of training data received from the first sensor to the trained machine learning program to generate a training dataset based on the determined domain translation of data from the first data space to the second data space.

The trained machine learning program may generate, based on the determined domain translation, transformed annotation data from the annotation data included in the set of training data.

A sensor data space is specified based on a sensor extrinsic parameter and a sensor intrinsic parameter.

The sensor extrinsic parameter may include location coordinates and a sensor pose including a roll, a pitch, and a horizon.

The sensor intrinsic parameter may include at least one of a resolution, a frame rate, a resolution, a distortion, a field of view, or a focal length.

The instructions may further include instructions to determine a rigid body transformation between the first sensor and the second sensor based on (i) the first sensor data and the sensor data, or (ii) stored rigid body transformation of a mounting bracket that is configured to hold the first sensor and the second sensor.

The first sensor and the second sensor may be selected from a plurality of vehicle camera sensors.

The system may further include a vehicle computer, programmed to receive the generated training data set from the computer, to use the received training data set to retrain a vehicle machine learning program, to input data received from the second sensor to the retrained machine learning program, and to operate the vehicle based on an output of the retrained machine learning program.

The vehicle machine learning program may include a neural network trained to provide at least one of object detection, lane detection, traffic sign detection.

Further disclosed herein is a method, including receiving first sensor data from a first sensor, wherein the first sensor data is defined in part by a first data space that includes first parameters of the first sensor, and second sensor data from a second sensor, wherein the second sensor data is defined in part by a second data space that includes second parameters of the second sensor, inputting the first sensor data and the second sensor data to a machine learning program to train the machine learning program to determine a domain translation of data from the first data space to the second data space, and then inputting a set of training data received from the first sensor to the trained machine learning program to generate a training dataset based on the determined domain translation of data from the first data space to the second data space.

The method may further include generating, in the trained machine learning program, based on the determined domain translation, transformed annotation data from the annotation data included in the set of training data.

A sensor data space may be specified based on a sensor extrinsic parameter and a sensor intrinsic parameter.

The sensor extrinsic parameter may include location coordinates and a sensor pose including a roll, a pitch, and a horizon.

The sensor intrinsic parameter may include at least one of a resolution, a frame rate, a resolution, a distortion, a field of view, or a focal length.

The method may further include determining a rigid body transformation between the first sensor and the second sensor based on (i) the first sensor data and the sensor data, or (ii) stored rigid body transformation of a mounting bracket that is configured to hold the first sensor and the second sensor.

The first sensor and the second sensor may be selected from a plurality of vehicle camera sensors.

The method may further include receiving, in a vehicle computer, the generated training data set from the computer, using the received retraining data set to retrain a vehicle machine learning program, inputting data received from the second sensor to the retrained machine learning program, and operating the vehicle based on an output of the retrained machine learning program.

The vehicle machine learning program may include a neural network trained to provide at least one of object detection, lane detection, traffic sign detection.

Retraining the vehicle machine learning program may further include training the vehicle machine learning program, trained to operate based on data from the first data space, to operate based on input data from the second data space.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

Exemplary System Elements

A machine learning program such as a deep neural network (DNN) may be trained to process image data, e.g., detecting objects. A vehicle computer may be programmed to receive image data from a camera sensor, e.g., a forward-looking camera, and input the image data to a machine learning program trained to detect objects such as other vehicles, pedestrians, obstacles, etc. The vehicle computer may be programmed to operate the vehicle in part based on an output of the trained machine learning programmed, e.g., to actuate a vehicle brake based on a detected object of the vehicle route within a specified distance, e.g., 50 meters, from the vehicle.

The machine learning program is trained using training data. Training data may include pre-recorded image data and annotations (i.e., labels) of the data as ground truth. For example, the training data may include image data of vehicle driving on a road which is additionally annotated (i.e., labelled) with ground truth, e.g., metadata identifying or classifying an object represented in the image data. Example image annotations can thus specify a location, type, dimensions, etc., of an object in an image. The training data is then fed to the machine learning program to train the program to detect objects. Typically a large amount of training data is used for training the machine learning program to achieve a desired performance.

Performance, in the present context, is a measurement of an ability of the machine learning program to correctly identify objects, i.e., a rate of correct detections, e.g., a percentage of objects correctly identified in a set of images. Neural network performance typically depends on training data. For example, training data lacking images of nighttime driving, inclement weather conditions, snow-covered roads, etc. may result in poor performance of a neural network in identifying objects in images acquired under such conditions.

Training data may be collected with a vehicle including sensors with specific parameters, e.g., sensor pose, resolution, field of view, distortion, focal point, etc. Thus, upon deploying a trained machine learning program to another vehicle with same camera sensor parameters of the vehicle used for collecting the training data, performance of a machine learning program can be expected to be similar to the performance of the trained machine learning program if deployed in the collection vehicle. However, upon a change in one or more sensor parameters, e.g., installing using a sensor with a different lens, a different resolution, a different CFA, a different field of view, a different pose, etc., a performance of the machine learning algorithm trained with data collected using the first sensor may be adversely affected. Thus, a trained machine learning program may fail to detect objects or mis-detect objects it otherwise could have been expected to detect. Recreate the training data using the second sensor, e.g., operating a collection vehicle with the second sensor to collect voluminous additional training data, and then annotating the additional data, can be impractical or difficult. Disclosed herein are techniques to provide available training data from a first sensor with first parameters to be usable for training a machine learning program to detect objects in data provided from a second sensor with second, different sensor parameters.

In one example, a second sensor is mounted to a vehicle in addition to a first sensor. A computer captures respective image data from the first and second sensors in order to train a data transforming machine learning program to determine a domain translation of data from the first to the second sensor. The computer may be programmed, using the generated domain translation from a first data space of the first sensor to a second data space of the second sensor, to generate a transformed set of training data from sensed training data including data received from the first sensor. A "data space" for a sensor is a range or set of values that can be included in data output from the sensor. A data space can be defined, i.e., determined by a set of sensor parameters including extrinsic and intrinsic sensor parameters, as discussed below with reference to Table 1. That is, sensor parameters can determine what data can be output by a sensor. The computer may be programmed to then input the transformed training data to the machine learning program to train the machine learning program to use data received from the second sensor.

FIG. 1 illustrates an example host vehicle 100 including a computer 110, actuator(s) 120, and object detection sensors 130A, 130B, e.g., cameras, with respective fields of view 140A, 140B. In one example shown in FIG. 1, respective sensors 130 may be directed to fields of view that are left, rear, right, and front of the vehicle 100. Additionally or alternatively, sensors 130 as described herein could be implemented in a variety of different devices, machines, or architectures, e.g., the computer 110 and the sensor 130 could be included in a mobile robot, an aerial drone, an internet of things (IoT) device, etc.

A vehicle 100 body has a longitudinal axis A1 and one or more lateral axes A2 perpendicular to the axis A1. A reference point such as a geometrical center point 150 can be specified for a vehicle 100, e.g., a point at which respective longitudinal axis A1 and a lateral Axis A2 of the vehicle 100 intersect. A vehicle 100 may be powered in a variety of known ways, e.g., with an electric motor and/or internal combustion engine.

The vehicle 100 computer 110 includes a processor and a memory such as are known. The memory includes one or more forms of computer-readable media, and stores instructions executable by the vehicle 100 computer 110 for performing various operations, including as disclosed herein. The computer 110 may include programming to operate one or more of vehicle 100 brakes, propulsion (e.g., control of acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 network such as a communications bus as described further below, more than one processor, e.g., included in components such as sensors 130, electronic controller units (ECUs) or the like included in the vehicle 100 for monitoring and/or controlling various vehicle 100 components, e.g., a powertrain controller, a brake controller, a steering controller, etc. The computer 110 is generally arranged for communications on a vehicle 100 communication network that can include a bus in the vehicle 100 such as a controller area network (CAN) or the like, and/or other wired and/or wireless mechanisms. Via the vehicle 100 network, the computer 110 may transmit messages to various devices in the vehicle 100 and/or receive messages (e.g., CAN messages) from the various devices, e.g., sensors 130, an actuator 104, a human-machine interface (HMI), etc. Alternatively or additionally, in cases where the computer 110 comprises a plurality of devices, the vehicle 100 communication network may be used for communications between devices represented as the computer 110 in this disclosure.

The actuators 120 are implemented via circuits, chips, or other electronic and/or mechanical components that can actuate various vehicle 100 subsystems in accordance with appropriate control signals, as is known. The actuators 120 may be used to control vehicle 100 systems such as braking, acceleration, and/or steering of the vehicles.

A sensor 130 is a device that can obtain one or more measurements of one or more physical phenomena. Often, but not necessarily, a sensor 130 includes an analog-to-digital converter to convert sensed analog data to a digital signal that can be provided to a digital computer 110, e.g., via a network. Sensors 130 can include a variety of devices, and can be disposed to sense an environment, provide data about a machine, etc., in a variety of ways. Moreover, various controllers in a vehicle 100 may operate as sensors 130 to provide data via the vehicle 100 network or bus, e.g., data relating to vehicle 100 speed, acceleration, location, subsystem and/or component status, etc. Sensors 130, in or on a vehicle 100 could include cameras, short-range radar, long-range radar, LIDAR, and/or ultrasonic transducers, weight sensors 130, accelerometers, motion detectors, etc. To provide just a few non-limiting examples, sensor 130 data could be obtained from active or passive sensing and could include data for determining a position of a component, a location of an object, a speed of an object, a type of an object, a slope of a roadway, a temperature, a presence or an amount of moisture, a fuel level, a data rate, etc.

Vehicle 100 sensors 130 may include a variety of devices such as are known to provide data to the vehicle 100 computer 110. The vehicle 100 sensors 130 may further alternatively or additionally, for example, include camera vehicle 100 sensor(s), e.g., front view, side view, etc., providing images from an area surrounding the vehicle 100. In the context of this disclosure, object 170 is a physical, i.e., material, item that is detectable by vehicle 100 sensors 130. Thus, vehicles, as well as other items including as discussed below, fall within the definition of "object 170" herein.

A machine learning program P is deployed in the computer 110 to process data D received from a vehicle 100 sensor 130A. For example, the machine learning program P is trained to detect an object 170 in the field of view 140A of the sensor 130A. As discussed above, the sensor 130A may be replaced with a sensor 130B with different parameters than sensor 130A parameters, e.g., having a different resolution. As explained herein below the machine learning program P can be trained to operate based on data received from the new sensor 130B, although the sensor 130B may have different parameters. In one example, the second sensor 130B may be selected from a plurality of available sensors 130. For example, upon determining that a replacement camera sensor 130 with same parameters as the sensor 130A is unavailable, the sensor 130B may be selected from a set of available camera sensors 130. For example, machine learning program P may be a machine vision program including a neural network trained to provide object detection, lane detection, traffic sign detection, etc.

For example, as shown in FIG. 1, the second sensor 130B can be mounted to a vehicle 100 windshield having a field of view 140B overlapping with the field of view 140A of the first sensor 130A. The vehicle 100 may be navigated on a test route, e.g., a road in an urban area, a test track environment designed to simulate a real road, etc., while the computer 110 collects the first and second data $D_1$, $D_2$ from respective sensors 130A, 130B. Thus, data is recorded from both cameras 130A, 130B as the vehicle 100 moves on the test route. The computer 110 can be programmed to receive and store first data $D_1$ from a first sensor 130A and second data $D_2$ from the second sensor 130B. The first and second data $D_1$, $D_2$ are image data received via wired or wireless communications from the sensors 130A, 130B. In some examples, image data may be video data stored as a series of frames, e.g., 30 frames per second, each frame including image pixel data. As discussed below, the collected data $D_1$, $D_2$ is used to determine a domain translation T between the data spaces $S_1$, $S_2$ of the sensors 130A, 130B. Additionally or alternatively, the computer 110 may collect data from three or more sensors 130. In one example, the machine learning program may be trained to use data from a first sensor. Then, the computer 110 may collect data from the first sensor 130, a second sensor 130, and a third sensor 130. Collected data may be used to determine a first domain translation T between data spaces S of the first and second sensor 130 and a second domain translation T between data spaces S of the first and third sensor 130.

In general data D received from a vision sensor 130, e.g., a camera sensor 130, is included in the sensor data space S including parameters specifying (i) extrinsic parameters such as location and orientation of the sensor relative to a vehicle reference coordinate system, and/or (ii) intrinsic parameters such as a field of view of the sensor, data resolution, focal point, image distortion, CFA, color space, and parameters of sensor 130 image signal processor (ISP) such as gamma correction, exposure, etc. The first sensor data $D_1$ is included in a first data space $S_1$ determined by first parameters of the first sensor 130A, e.g., an image resolution of first sensor data $D_1$ is based on an image resolution defining the first data space $S_1$. Further, the second sensor data $D_2$ is included in a second data space $S_2$ determined by second parameters of the second sensor 130B, e.g., an image resolution of the second sensor data $D_2$ is based on an image resolution defining the second data space $S_2$. Table 1 shows an example set of parameters that determine a data space S of a vision sensor 130. A change in a sensor data space S results in a change in a representation of the sensed environment. For example, a change in a sensor 130 pose or sensor resolution results in different image data received from the sensor 130.

TABLE 1

| Parameter | Description |
| --- | --- |
| Pixel brightness range | A range specifying a range of light intensity of a pixel, e.g., 0 (zero) to 255 |
| Frame rate | A number of frames received per second, e.g., 30 fps (frames per second) |
| Resolution | A number of pixels in an image, e.g., a 1000 by 1000 image which is 1 Mega-Pixel |
| Distortion | A mathematical function, e.g., a polynomial, to model a nonlinearity of a sensor lens |
| Field of view | A portion of exterior environment included in the received image data, e.g., specified in angles such as 120 degrees horizontal, 90 degrees vertical. |
| Focal length | A distance between the lens and the focal point. |
| CFA | Color Filters Array is a mosaic of tiny color filters placed over an image sensor to capture color information. |
| ISP | Image Signal Processor of an image sensor operates based on multiple parameters such as exposure, gamma correction, etc. |
| Color space | Color space of images can be modeled using various types of filters included in image sensor, e.g., RGB (Red Green Blue), RCCC (Red Clear), etc. |
| Orientation | Roll, pitch, and yaw of the camera sensor relative to a reference point |
| Location | Coordinates x, y, and z of the camera sensor relative to a reference point, e.g., the vehicle reference point |

A coordinate system 160 may be a 2D (two-dimensional) or 3D (three-dimensional) Cartesian coordinate system with an origin point inside or outside the vehicle 100. A coordinate system 160A may have an origin at a first sensor 130A reference point, e.g., center point, and a second coordinate system 160B may have an origin at a second sensor 130B reference point, e.g., a center point.

Intrinsic calibration parameters are applicable regardless of where a sensor 130 is located in or on a vehicle 100. Extrinsic calibration parameters, in contrast, are values that are specific to (i) a location of the radar sensor 130 relative to the coordinate system, and (ii) a pose (roll, pitch, and yaw) of the radar sensor 130 relative to the coordinate system. Various conventional techniques may be used to determine extrinsic calibration values, e.g., placing object 170 within the field of view 140 of a sensor 130 mounted to the vehicle 100 and determining a roll, pitch, and yaw of the sensor 130 based on the received image data.

Figure 2A:
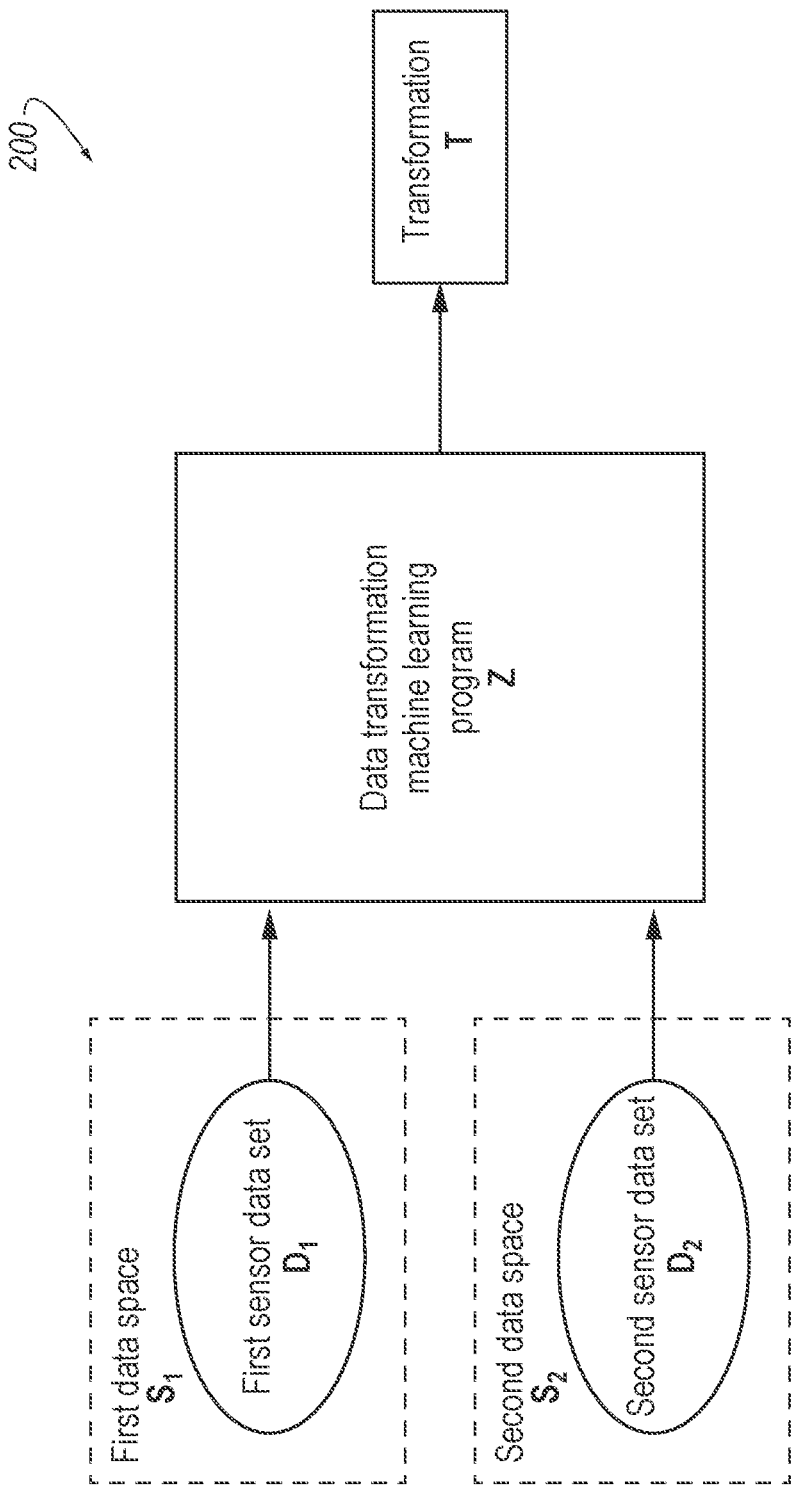
FIG. 2A illustrates training a machine learning program to determine a domain translation from a first data space to a second data space.

With reference to FIG. 2A, in a training process 200 the computer 110 can be programmed to train a domain translation machine learning program Z to determine a domain translation T from the first data space $S_1$ to the second data space $S_2$ by inputting the first sensor 130A data $D_1$ and the second sensor 130B data $D_2$ as training data. As shown in FIG. 2, the first data set $D_1$ is a subset of the data space $S_1$ and the second data set $D_2$ is a subset of the second data space $S_2$. Notably, data sets $D_1$, $D_2$ are significantly smaller in volume compared to pre-recorded training data. For example, for a vehicle object detection machine learning program P, training data may include training data of several hundred thousands kilometers of test drive, whereas the collected data sets $D_1$, $D_2$ collected to train the domain translation machine learning program may include test drive of a few kilometers. The machine learning program Z is used to transform the training data produced using the first sensor 130A to new training data. This new training data (or retraining data) can then be used for retraining the machine learning program P to operate based on data received from the second sensor 130B instead of the first sensor 130A. Typically, the machine learning program Z is deployed in a second computer, e.g., a computer remote from a vehicle 110. Alternatively, as discussed with reference to FIG. 2D, the machine learning program Z may be used to operate the machine learning program P based on data from the second sensor 130B without a need to retrain the machine learning program P.

Typically, the first and second sensors 130A, 130B are mounted such that the first and second sensors 130A, 130B have overlapping fields of view 140A, 140B. In one example, the second sensor 130 may be attached to, e.g., a vehicle 100 front windshield, using a mechanical attachment such as a mounting bracket, clips, straps, glue, and/or screws, etc. An attachment may be formed of plastic, metal, wood, etc. Based on a shape and materials of an attachment such as a mounting bracket, and also on the shape of the sensors 130A, 130B, and locations and orientations of the sensors 130A, 130B relative to the vehicle 100 reference point 150, a rigid body transformation R may be specified. A rigid body transformation specifies a geometric transformation of a Euclidean space that preserves the Euclidean distance between every pair of points including relative pose (roll, pitch, and yaw) and relative location coordinates. With reference to FIG. 1, a rigid body transformation matrix R specifies a transformation from a first sensor 130A coordinate system 160A to a second sensor 130B coordinate system 160B.

The computer 110 may be programmed to determine a rigid body transformation matrix R between the first sensor 130A and the second sensor 130B based on the first sensor data $D_1$ and the second sensor data $D_2$. The computer 110 may be programmed to determine the rigid body transformation R from the first camera 130A to the second camera 130B based on the image data received from the camera sensors 130A, 130B. Additionally or alternatively, the computer 110 may be programmed to determine, using conventional techniques, the rigid body transformation matrix R based on sensors 130A, 130B extrinsic calibration parameters.

With reference to FIG. 1, in one example, the computer 110 may be programmed to determine the rigid body transformation matrix R by "matching" one or more features, e.g., object(s) 170, road marking, etc., between the first and second camera 130A, 130B images, thereby determining a first sensor 130 pose and location translation relative to a second sensor 130 pose and location, represented as a rigid body transformation matrix R. In the present context, matching features means recognizing feature points, e.g., edges of an object 170, edge of a lane marking, etc., identified in the first image based on the first sensor 130A data that to same feature, e.g., edges of the object 170, identified in the second image based on the second sensor 130B data. The computer 110 may be programmed to perform (or compute) a homography or projective transformation to match features between the images data of the first and second camera sensors 130A, 130B.

A "homography" or a "perspective transformation" is a line-preserving projective mapping of feature points observed from two different perspectives. "Line preserving" means that if multiple points are on a same line in the first image received from the first sensor 130A, the matching feature points are on a same line in the second image received from the second sensor 130B. In other words, the homography provides a mathematical relationship, e.g., the rigid body transformation R.

Additionally or alternatively, a rigid body transformation R of a mounting bracket that is configured to hold the first sensor 130A and the second sensor 130B may be stored in a computer 110 memory. For example, using a 3D (three-dimensional) printer, a mounting bracket may be made to hold the first and second sensors 130A, 130B. The rigid body transformation R from the first sensor 130A to the second sensor 130B may be generated, using conventional techniques, based on the stored CAD (Computer-Aided Design) data used for making the mounting bracket.

Additionally, the collected first and second data $D_1$, $D_2$ is annotated with ground truth data. Table 2 shows an example set of annotation data for the first and second data $D_1$, $D_2$. For example, annotation data shows an object 170 that is located in location coordinates $x_1$, $y_1$, $z_1$ based on the first frame received from the first camera sensor 130A is located at location coordinates $x_2$, $y_2$, $z_2$ based on data received from the second sensor 130B. In another example, the collected first and second data $D_1$, $D_2$ may be used without annotation to train the machine learning program Z. This example implementation is, for example, useful for the use case discussed with respect to FIG. 2D.

TABLE 2

| Frame number | Annotation Data AD |
|---|---|
| 1 | $D_1$: object 1 at location $x_1$, $y_1$, $z_1$ relative to coordinates system 160A |
| | $D_2$: object 1 at location $x_2$, $y_2$, $z_2$ relative to coordinates system 160B |
| 2 | $D_1$: edge of the road specified by $y = a_1x^2 + b_1x + c_1$ |
| | $D_2$: edge of the road specified by $y = a_2x^2 + b_2x + c_2$ |
| ... | ... |

The machine learning program Z is then trained using the collected data $D_1$, $D_2$ and ground truth data, e.g., as shown in Table 2, for transforming any other sensor data, e.g., pre-recorded training data, generated based on the first data space $S_1$ of the first sensor 130A to data that is based on the second data space $S_2$. In other words, the machine learning program Z provides a non-linear domain translation T to transform data from the first data space S1 to the second data space $S_2$. The non-linear domain translation T transforms the sensor data; thus, the generated data is defined based on parameters of the second data space $S_2$.

In one example, the machine learning program Z may take the rigid body transformation R as an input in addition to the collected data $D_1$, $D_2$. Additionally or alternatively, the machine learning program Z may be trained to determine the transformation R from the first sensor 130A to the second sensor 130B. Upon training the domain translation machine learning program Z, the machine learning program Z can generate annotated data based on the data space $S_2$ when annotated data based on the data space $S_1$ is input to the trained machine learning program Z. For example, with reference to example Table 2, the machine program Z can generate an annotation for location coordinates $x_2$, $y_2$, $z_2$ of an object 170 in the generated data based on annotation of the object 170 in the input data showing the object at location coordinates $x_1$, $y_1$, $z_1$.

The trained machine learning program Z can then be used to convert the pre-recorded training data which was captured using the first sensor 130A to training data based on the second sensor 130B data space $S_2$. The computer 110 can be programmed to then input a set of training data $D_h$ (pre-recorded training data) received from the first sensor 130A to the trained machine learning program Z to generate a training dataset $D_h^T$ based on the determined domain translation T of data $D_h$ from the first data space $S_1$ to the second data space $S_2$. Equation (1) shows training data $D_h$ including image data $Im_h$ captured using the first sensor 130A based on the first data space $S_1$ and annotation data $AD_h$. Annotation data may have a similar format as shown in Table 2 but notably may include a large amount of data because of providing ground truth for a large amount of image data $Im_h$.

$$D_h = \{Im_h, AD_h\} \quad (1)$$

With reference to Equation (2), the computer 110 may be programmed to input the training data $D_h$ to the domain translation machine leaning program Z which outputs the transformed training data $D_h^T$. With reference to Equation (3), the transformed training data $D_h^T$ includes the transformed image data $Im_h^T$ and the transformed annotation data $AD_h^T$.

$$D_h^T = Z(D_h) \quad (2)$$

$$D_h^T = \{Im_h^T, AD_h^T\} \quad (3)$$

Figure 2B:
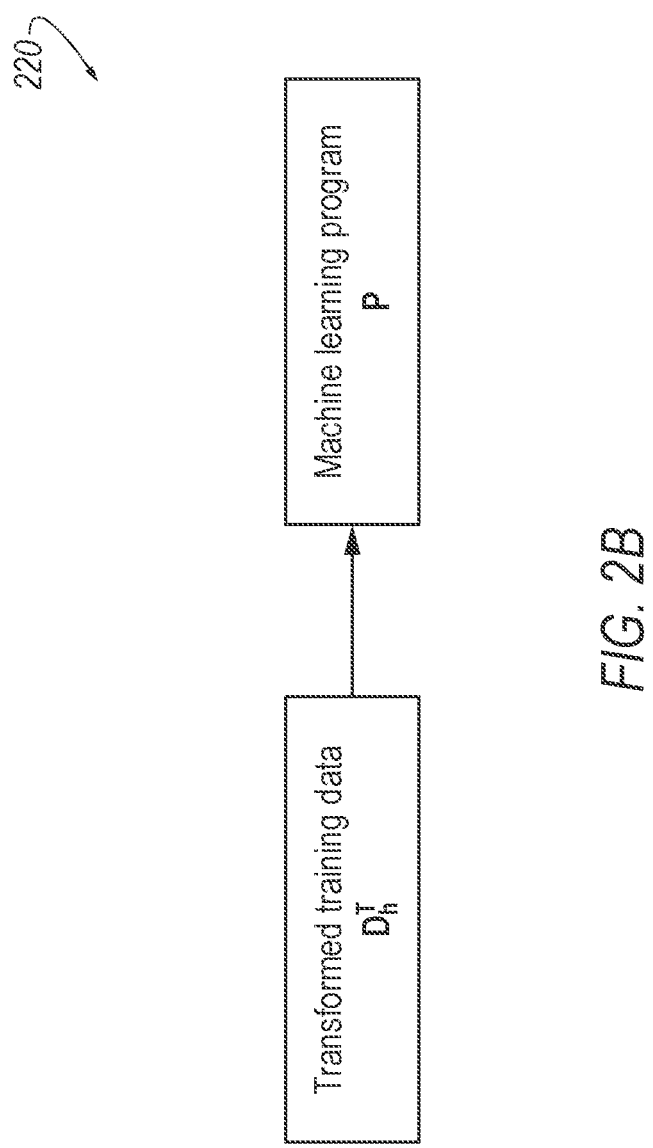
FIG. 2B illustrates retraining another machine learning program, previously trained to operate based on data from the first data space, to operate based on data from the second data space.
Figure 2C:
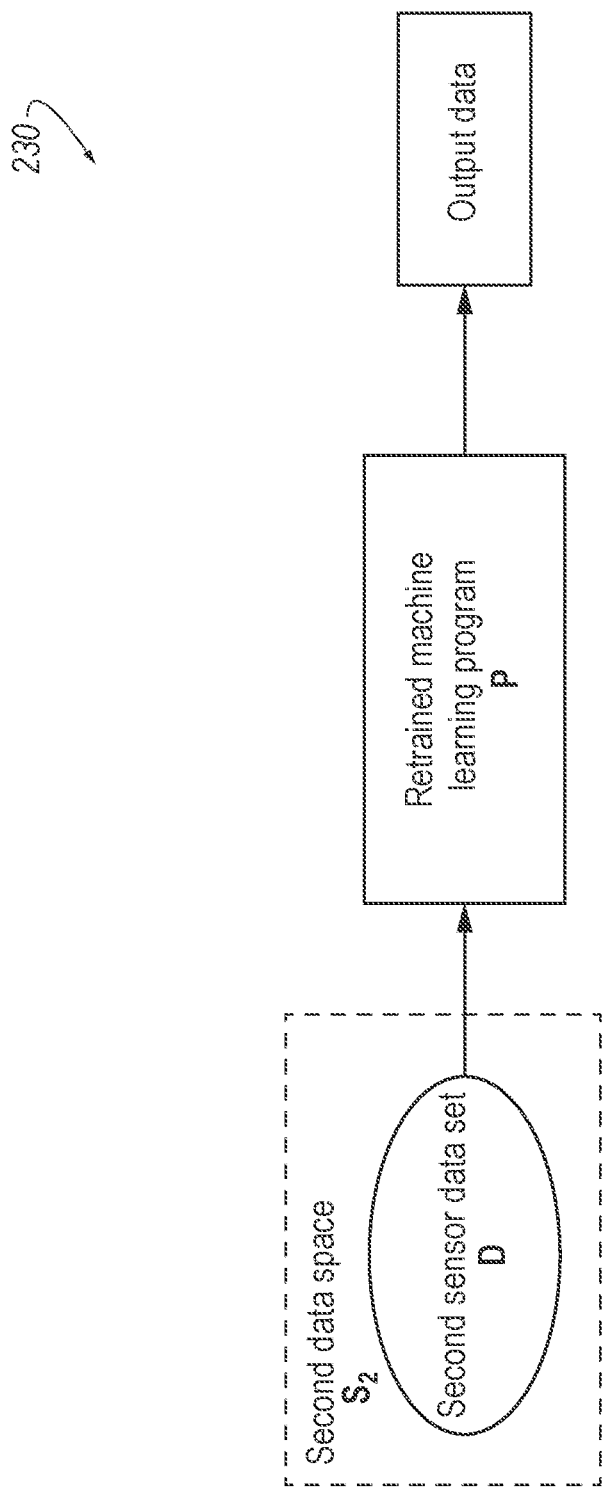
FIG. 2C illustrates an operation of the retrained machine learning program of FIG. 2B based on data from the second data space.

With reference to FIG. 2B, in a training process 210, the computer 110 may be programmed to receive the generated training data $D_h^T$ and use the data set $D_h^T$ to retrain a vehicle 105 machine vision program P. With reference to FIG. 2C, in a process 230, upon training the machine learning program P based on the generated training data $D_h^T$, the computer 110 may be programmed to input data received from the second sensor 130B to the retrained machine vision program P; and to operate the vehicle based on an output of the machine vision program. In the present context, "retraining" means training the machine learning program P based on the transformed training data $D_h^T$ to operate based on sensor 130B data with the data space $S_2$ instead of data from the first sensor 130A with the data space $S_1$.

As discussed above, the first and second sensors 130A, 130B may be installed using a mounting bracket having overlapping fields of view 140A, 140B. Thus, data from the second sensor 130B used to train the domain translation program Z includes data from the second sensor 130B mounted in a location different from the location of the first sensor 130A. However, upon training the domain translation machine learning program Z, the second sensor 130B may replace the first sensor 130A, i.e., mounted at the location of the first sensor 130A. Thus, the sensor 130B in the training data set $D_1$, $D_2$ is located in a different location compared to the sensor 130A location, e.g., with a mounting bracket on the vehicle 105 windshield, as shown in FIG. 1. However, the sensor 130B may replace the sensor 130A by placing the sensor 130B at the location of the sensor 130A, e.g., inside the sensor 130A mounting bracket. In such an example, the transformed training data $D_h^T$ may be further transformed to generate data from the perspective of the first sensor 130A, i.e., pose and location of the first sensor 130A. For example, the computer 110 may be programmed to further transform the generated data $D_h^T$ to generate transformed data $D_h^{T_R}$. The data $D_h^{T_R}$ represents a reverse domain translation of data to represent the data from the perspective of the first sensor 130A location and pose. The computer 110 may be programmed to perform the domain translation of data $D_h^T$ to generate the reverse transformed data $D_h^{T_R}$ using various techniques such as perspective transformation, etc.

Figure 2D:
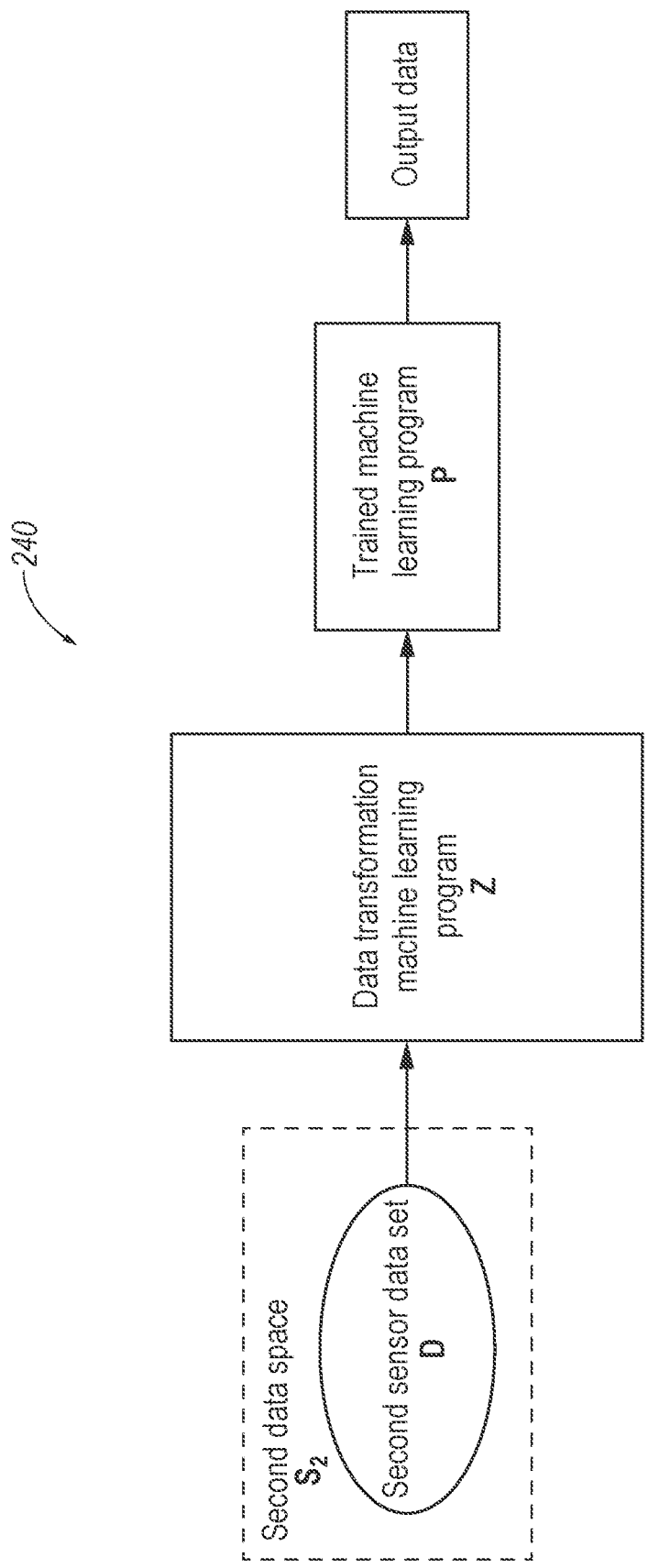
FIG. 2D illustrates an operation of the machine learning program of FIG. 2B, that is trained to operate based on data from the first data space, receiving data from the second data space.

In one example shown in FIG. 2D, in a process 240, upon training the machine learning program Z, the computer 110 may be programmed to input data received from the second sensor 130B to the domain translation machine learning program Z; and to operate the vehicle 100 based on an output of the machine vision program P. Notably, in this example, there is no need to retrain the machine learning program P to operate based on the second data space $S_2$ because the machine learning program Z transforms the data received from the second sensor 130B to the first data space $S_1$.

FIG. 3 shows an example flowchart of a process 300 for retraining the machine learning program P that is trained to use data from a first sensor 130A based on a first data space $S_1$ to operate based on data received from a second sensor 130B based on a second data space $S_2$. A computer 110, e.g., a vehicle 100 computer 110, and/or a combination of multiple computers, e.g., a vehicle 100 computer may be programmed to perform blocks of the process 300.

The process 300 begins in a block 305, in which the computer 110 stores a first machine learning program P for performing an operation, e.g., detecting object(s) 170, etc., in data received from a first sensor 130A. The first machine learning program P is trained using training data $D_h$.

Next, in a decision block 310, the computer 110 determines whether the second sensor 130B is mounted to have a field of view 140B overlapping with the field of view 140A of the first sensor 130A. The computer 110 may be programmed to determine that the second sensor 130B is installed, e.g., using a mounting bracket, upon receiving user input, e.g., via a human-machine interface. If the computer 110 determines that the second sensor 130B is installed, then the process 300 proceeds to a block 315; otherwise the process 300 proceeds to a block 345.

In the block 315, the computer 110 receives sensor data $D_1$, $D_2$ from the first and second sensors 130A, 130B. The first sensor data $D_1$ is based on a first data space $S_1$ and the second sensor data $D_2$ is based on a second data space $S_2$.

Next, in a decision block 320, the computer 110 determines whether the received data $D_1$, $D_2$ includes annotations (ground truth data). For example, the received data $D_1$, $D_2$ may include added annotations such as example annotations shown in Table 2. If the computer 110 determines that the annotations for the collected data $D_1$, $D_2$ is received, then the process 300 proceeds to a block 325; otherwise the process 300 returns to the decision block 320. As discussed with reference to FIG. 2D, in some examples, the collected data $D_1$, $D_2$ may lack annotation and the machine learning program P may operate based on an output of the machine learning program Z transforming the data received from the second sensor 130B to the first data space $S_1$.

In the block 325, the computer 110 trains a second machine learning program Z (or domain translation machine learning program) based on data from first and second sensor $D_1$, $D_2$ and the received annotation data. The computer 110 may be additionally programmed to determine a rigid body transformation R from the first camera sensor 130A to the second camera sensor 130B or receive data including the rigid body transformation R from a computer 110 memory.

Next, in a block 330, the computer 110 transforms training data $D_h$ using the trained second machine learning program Z. The computer 110 may be programmed to input the training data $D_h$ to the trained domain translation machine learning program Z, thereby generating the transformed training data $D_h^T$. If the second sensor 130B is planned to be mounted at the location and pose of the first sensor 130A, the computer 110 may be further programmed to further transform the transformed training data $D_h^T$, based on the rigid body transformation R, to generate the transformed training data $D_h^{T_R}$.

Next, in a block 335, the computer 110 retrains the first machine learning program P, e.g., an object detection machine learning program, using the transformed training data $D_h^T$. The computer 110 may be programmed to input the transformed training data $D_h^T$ to the first machine learning program P to train the machine learning program P to operate based on data received from the second sensor 130B having a second data space $S_2$. As discussed above, if the second computer 130B is expected to be installed at the location and pose of the first sensor 130A, then the first machine learning program P may be programmed to use the transformed training data $D_h^{T_R}$ for retraining of the first machine learning program P.

Next, in a block 340, the computer 110 operates, e.g., the vehicle 100, using retrained first machine learning program P. Thus, the first sensor 130A may receive sensor data from the second sensor 130B, e.g., replacing the first sensor 130A, and perform an operation such as object detection based on the received data.

Following the block 340, the process 300 ends, or returns to the block 305, although not shown in FIG. 3.

Based on the disclosed technique herein, a first sensor having a first data space can be replaced with a second sensor having a second data space without a need to recapture large amounts of training data to retrain a machine learning program trained to use data from the first sensor. The pre-recorded training data can be transformed to new training data based on the second data space. Thereby, foregoing a need to recapture the entire set of pre-recorded training data.

Use of "in response to," "based on," and "upon determining" herein indicates a causal relationship, not merely a temporal relationship.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, Python, Intercal, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer including a processor and a memory, the memory storing instructions executable by the processor to:
   receive first sensor data from a first camera, wherein the first sensor data is defined in part by a first data space that includes first parameters of the first camera, and second sensor data from a second camera, wherein the second sensor data is defined in part by a second data space that includes second parameters of the second camera;
   input the first sensor data and the second sensor data to a machine learning program to train the machine learning program to determine a domain translation of data from the first data space to the second data space; and
   then input a set of training data received from the first camera to the trained machine learning program to generate a training dataset based on the determined domain translation of data from the first data space to the second data space.

2. The system of claim 1, wherein the trained machine learning program generates, based on the determined domain translation, transformed annotation data from the annotation data included in the set of training data.

3. The system of claim 1, wherein a sensor data space is specified based on a camera extrinsic parameter and a camera intrinsic parameter.

4. The system of claim 3, wherein the sensor extrinsic parameter includes location coordinates and a camera pose including a roll, a pitch, and a horizon.

5. The system of claim 3, wherein the camera intrinsic parameter includes at least one of a resolution, a frame rate, a distortion, a field of view, or a focal length.

6. The system of claim 1, wherein the instructions further include instructions to determine a rigid body transformation between the first camera and the camera sensor based on (i) the first sensor data and the sensor data, or (ii) stored rigid body transformation of a mounting bracket that is configured to hold the first camera and the second camera.

7. The system of claim 1, wherein the first camera and the second camera are selected from a plurality of vehicle camera-sensors.

8. The system of claim 1, further comprising a vehicle computer, programmed to:
   receive the generated training data set from the computer;
   use the received training data set to retrain a vehicle machine learning program;
   input data received from the second camera to the retrained machine learning program; and
   operate the vehicle based on an output of the retrained machine learning program.

9. The system of claim 8, wherein the vehicle machine learning program includes a neural network trained to provide at least one of object detection, lane detection, traffic sign detection.

10. A method, comprising:
    receiving first sensor data from a first camera, wherein the first sensor data is defined in part by a first data space that includes first parameters of the first sensor, and second sensor data from a second camera, wherein the second sensor data is defined in part by a second data space that includes second parameters of the second camera;
    inputting the first sensor data and the second sensor data to a machine learning program to train the machine learning program to determine a domain translation of data from the first data space to the second data space; and
    then inputting a set of training data received from the first camera to the trained machine learning program to generate a training dataset based on the determined domain translation of data from the first data space to the second data space.

11. The method of claim 10, further comprising, generating, in the trained machine learning program, based on the determined domain translation, transformed annotation data from the annotation data included in the set of training data.

12. The method of claim 10, wherein a sensor data space is specified based on a camera extrinsic parameter and a camera intrinsic parameter.

13. The method of claim 12, wherein the camera extrinsic parameter includes location coordinates and a sensor pose including a roll, a pitch, and a horizon.

14. The method of claim 12, wherein the camera intrinsic parameter includes at least one of a resolution, a frame rate, a distortion, a field of view, or a focal length.

15. The method of claim 10, further comprising determining a rigid body transformation between the first camera and the second camera based on (i) the first sensor data and the sensor data, or (ii) stored rigid body transformation of a mounting bracket that is configured to hold the first camera and the second camera.

16. The method of claim 10, wherein the first camera and the second camera are selected from a plurality of vehicle camera-sensors.

17. The method of claim 10, further comprising:
receiving, in a vehicle computer, the generated training data set from the computer;
using the received retraining data set to retrain a vehicle machine learning program;
inputting data received from the second camera to the retrained machine learning program; and
operating the vehicle based on an output of the retrained machine learning program.

18. The method of claim 17, wherein the vehicle machine learning program includes a neural network trained to provide at least one of object detection, lane detection, traffic sign detection.

19. The method of claim 17, wherein retraining the vehicle machine learning program further comprises training the vehicle machine learning program, trained to operate based on data from the first data space, to operate based on input data from the second data space.

20. A system, comprising: a first computer including a first processor and a first memory, the first memory storing instructions executable by the first processor to: receive first sensor data from a first sensor, wherein the first sensor data is defined in part by a first data space that includes first parameters of the first sensor, and second sensor data from a second sensor, wherein the second sensor data is defined in part by a second data space that includes second parameters of the second sensor; input the first sensor data and the second sensor data to a machine learning program to train the machine learning program to determine a domain translation of data from the first data space to the second data space; and then input a set of training data received from the first sensor to the trained machine learning program to generate a training dataset based on the determined domain translation of data from the first data space to the second data space; and a second computer for a vehicle, the second computer including a second processor and a second memory, the second memory storing instructions executable by the second processor to: receive the generated training data set from the computer; use the received training data set to retrain a vehicle machine learning program; input data received from the second sensor to the retrained machine learning program; and operate the vehicle based on an output of the retrained machine learning program.

* * * * *

UNITED STATES PATENT AND TRADEMARK OFFICE
CERTIFICATE OF CORRECTION

PATENT NO. : 12,067,087 B2
APPLICATION NO. : 17/330692
DATED : August 20, 2024
INVENTOR(S) : Nikhil Nagraj Rao et al.

It is certified that error appears in the above-identified patent and that said Letters Patent is hereby corrected as shown below:

In the Claims

Claim 7, Column 14, Line 25 replace "camera-sensors" with "--camera--"

Claim 16, Column 15, Line 12 replace "camera-sensors" with "--camera--"

Signed and Sealed this
First Day of October, 2024

Katherine Kelly Vidal
*Director of the United States Patent and Trademark Office*